UNITED STATES PATENT OFFICE.

JAKOB SCHMID AND JOHANNES MOHLER, OF BASLE, SWITZERLAND, ASSIGNORS TO THE SOCIETY OF CHEMICAL INDUSTRY IN BASLE, OF SAME PLACE.

BLUE DYE.

SPECIFICATION forming part of Letters Patent No. 538,183, dated April 23, 1895.

Application filed August 4, 1894. Serial No. 519,486. (Specimens.)

*To all whom it may concern:*

Be it known that we, JAKOB SCHMID and JOHANNES MOHLER, citizens of Switzerland, residing at Basle, Switzerland, have invented new and useful Improvements in the Production of a Blue Coloring-Matter or Dye-Stuff, of which the following is a specification.

Our invention relates to the manufacture of a new and valuable poly oxy thionin coloring matter resulting by condensation of 7. oxy 1.2 naphthoquinone 4. monosulfonic acid with thiosulfonic acid of para amido methyl (or ethyl) benzylanilin sulfonate of soda.

For the production of the said 7. oxy 1.2 naphthoquinone 4. monosulfonic acid, mononitroso-dioxy-naphthalene 2.7 is dissolved in a cold solution of bisulfite of sodium and treated with concentrated muriatic acid. By simultaneous reduction and sulfonation, a difficultly soluble (1.) amido (2.7) dioxy naphthalene (4.) sulfonic acid is formed, which by further treatment with oxidizing agents, especially with nitric acid, is converted into the new 7. oxy 1.2 naphthoquinone 4. sulfonic acid.
This latter is separated from the solution in the form of its potassium salt crystallizing in red brown needles or leaves and it is represented by the formula
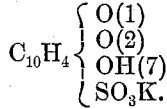

Hereinafter we give an exact description of the manner in which our invention is to be carried out into practice.

One hundred and seven kilos of a solution containing twenty-eight per cent. of methyl benzyl anilin sulfonate of soda are converted into the nitroso derivative in the usual way by the action of 21. kilos of muriatic acid of 21° Baumé and seven kilos of sodium nitrite. The mass is left to stand during twelve hours. In order to effect the conversion into the thiosulfonic acid, thirty-five kilos of acetic acid (containing forty per cent. of pure acid) and a solution of fifty kilos of sodium thiosulfate are added and the temperature is raised to from 80° to 100° centigrade until the nitroso compound has disappeared. To the thus produced thiosulfonic acid of para amido methyl benzylanilin mono sulfonate of soda, a concentrated solution of thirty kilos of 7. oxy 1.2 naphthoquinone 4. mono sulfonate of potassium is added and the mass is heated from two to three hours. From the dark colored liquid, the new dyestuff separates out as a green crystalline powder of metallic luster. It is washed in cold water and dried when it assumes a dark violet color.

The new coloring matter corresponding to the formula

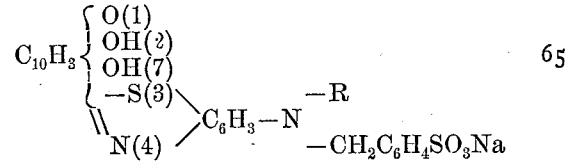

(where R signifies methyl or ethyl) forms a dark violet powder which dissolves with a blue violet coloration in concentrated sulfuric acid, changing to brown and green-blue under separation of blue-violet flakes upon addition of water. In hot water or in a dilute ammonia solution, the new dyestuff dissolves with a blue-violet color.

The new coloring matter is difficultly soluble in hot alcohol and insoluble in ether and benzene. It dyes on wool mordanted with chromium salts blue shades of great fastness to washing and light.

What we claim as new, and desire to secure by Letters Patent, is—

1. The process for the production of a new poly oxythionin coloring matter by condensation of 7. oxy 1.2 naphthoquinone 4. monosulfonic acid with thiosulfonic acid of para amido alkyl benzylanilin sulfonate of soda.

2. As a new article of manufacture the poly-oxythionin coloring matter which can be obtained by condensation of 7. oxy 1.2 naphthoquinone 4. monosulfonic acid with thiosulfonic acid of para amido alkyl benzyl anilin sulfonate of soda, corresponding to the formula—

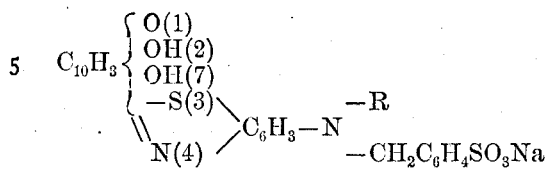

(where R signifies methyl or ethyl) forming a dark violet powder which dissolves with a blue-violet coloration in concentrated sulfuric acid, changing to brown and green-blue under separation of blue-violet flakes upon addition of water; it is difficultly soluble in hot alcohol and insoluble in ether and benzene; in hot water or in a dilute ammonia solution it dissolves with a blue violet color.

In testimony whereof we have hereunto set our hands in the presence of two subscribing witnesses.

JAKOB SCHMID.
JOHANNES MOHLER.

Witnesses:
GEORGE GIFFORD,
C. A. BURCKHARD.